United States Patent
Gu et al.

(10) Patent No.: US 7,502,515 B2
(45) Date of Patent: Mar. 10, 2009

(54) METHOD FOR DETECTING SUB-PIXEL MOTION FOR OPTICAL NAVIGATION DEVICE

(75) Inventors: Wei-Hsin Gu, Kao Hsiung (TW); Kun-Wei Lin, Hsin Chu (TW); Chun-Hung Lin, Feng Shan (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 749 days.

(21) Appl. No.: 10/843,387

(22) Filed: May 12, 2004

(65) Prior Publication Data

US 2005/0089196 A1 Apr. 28, 2005

(30) Foreign Application Priority Data

Oct. 24, 2003 (TW) .............................. 92129500 A

(51) Int. Cl.
G06K 9/36 (2006.01)
(52) U.S. Cl. ..................... 382/236; 250/208.1; 250/557
(58) Field of Classification Search .................. 382/236
See application file for complete search history.

(56) References Cited

U.S. PATENT DOCUMENTS

| 5,157,484 | A | * | 10/1992 | Pritchard et al. ............... 348/50 |
| 5,259,040 | A | * | 11/1993 | Hanna ........................... 382/107 |
| 5,627,586 | A | * | 5/1997 | Yamasaki ..................... 348/169 |
| 5,917,960 | A | * | 6/1999 | Sugawa ......................... 382/278 |
| 5,956,418 | A | * | 9/1999 | Aiger et al. .................. 382/154 |
| 5,978,143 | A | * | 11/1999 | Spruck ......................... 359/619 |
| 6,075,557 | A | * | 6/2000 | Holliman et al. ............... 348/51 |
| 6,130,707 | A | * | 10/2000 | Koller et al. ................. 348/155 |
| 6,167,154 | A | * | 12/2000 | Renaud et al. ............... 382/174 |
| 6,222,174 | B1 | * | 4/2001 | Tullis et al. ............... 250/208.1 |
| 6,256,016 | B1 | * | 7/2001 | Piot et al. .................... 345/166 |
| 6,489,945 | B1 | * | 12/2002 | Gordon ....................... 345/158 |
| 2002/0075384 | A1 | * | 6/2002 | Harman ........................ 348/43 |
| 2003/0035051 | A1 | * | 2/2003 | Cho et al. .................... 348/169 |

OTHER PUBLICATIONS

Gerald, Applied Numerical Analysis, Addison-Wesley Publishing Company, 2nd Edition, p. 465-468.*

* cited by examiner

Primary Examiner—Vikkram Bali
Assistant Examiner—David P Rashid
(74) Attorney, Agent, or Firm—Bacon & Thomas, PLLC

(57) ABSTRACT

A method for detecting sub-pixel motion for an optical navigation device is disclosed. The method calculates the displacement of the sub-pixel motion according to brightness curve equations of captured images, which is represented by positional coordinates x and y. The detection method includes capturing a first image frame and a second image frame at different times, selecting plural pixels from the first image frame as calculation reference pixels, generating brightness curve equations of the reference pixels, calculating partial-derivatives of the reference pixel to generate a plurality of two-dimensional first-order equations, and calculating the sub-pixel motion according to the plurality of the two-dimensional first-order equations. The method can reduce the pixel noise by choosing reliable pixels as the reference pixels. The method also reduce the noise by classifying the reference pixels.

27 Claims, 7 Drawing Sheets

| C2 | C3 | C4 |
|----|----|----|
| C1 | C0 | C5 |
| C8 | C7 | C6 |

METHOD FOR DETECTING SUB-PIXEL MOTION FOR OPTICAL NAVIGATION DEVICE

BACKGROUND

The present invention claims foreign priority to Taiwan patent application no. 92129500, filed on Oct. 24, 2003, the contents of which is incorporated herein by reference.

1. Field of the Invention

The invention relates generally to a method for detecting sub-pixel motion associated with an optical navigation device, and more particularly to a method for calculating and detecting the sub-pixel motion by calculating displacement of reference pixels within two image frames.

2. Background of the Invention

An optical navigation device, such as optical mouse, is known for its superiority over conventional mice with rollers. A typical optical navigation device includes an array of sensors that moves over a surface to capture images of the surface reflected on the sensors at different times. The captured images are pixel array data that are stored in a memory in a digital form. The optical navigation device further includes a processor for calculating a displacement between two adjacent images. After the displacement of the adjacent images is calculated, a navigation signal in the form of positional coordinates can be determined.

One of the methods used to calculate the displacement of the captured images is to detect sub-pixel motions of the captured images and determine the shifted distance of the sub-pixels. The conventional sub-pixel motion detection method takes part of a reference image frame as a search window and correlates the search window with a sample image frame (current image frame) to obtain a plurality of correlation values. The correlation values are then interpolated into a quadratic surface with an absolute minimum value. By determining the absolute minimum value of the quadratic surface, a displacement of the optical navigation device is then calculated. U.S. Pat. No. 5,729,008, entitled "Method and device for tracking relative movement by correlating signals from an array of photoelements," discloses this technology.

FIG. 1 of the present application illustrates an exemplary operational view of the above-mentioned sub-pixel motion detecting method used in a conventional optical navigation device. In FIG. 1, image frame 11 is a reference image frame with an image of T-shaped inherent structure feature, and image frame 12 is a sample image that is captured at a later time t, which is displaced with respect to reference frame 11 but shows substantially the same T-shaped inherent feature. To detect the displacement of sample frame 12 from reference frame 11, image frame 13 that includes the image of the T-shaped inherent structure feature is selected from reference frame 11 as a search window. Search window 13 is then used to compare with sample frame 12 in different directions.

Search window 13 is allowed to move to up, down, right, and left one pixel (to simplify the explanation, a full-pixel move is assumed). Element 15 of FIG. 1 represents a sequential shifting chart of search window 13 into its nearest eight neighboring pixels. For example, step "0" means that search window 13 does not shift, step "1" represents that search window 13 has shifted to the left, step "2" shows a diagonal move upward and to the left, step "3" shows an upward move, etc. Based on sequential shifting chart 15, search window 13 is correlated with sample frame 12, as shown in position frames 140 to 148 of FIG. 1. The results of correlation are also shown in FIG. 2 as nine correlation result values C0 to C8. As shown, the correlation position frame 140 designated by position 0 does not have a shift so that the result is merely a combination of search window 13 and sample frame 12. In this manner, position frame 144 designated by position 4 has a minimum number of shaded pixels, which means that position frame 144 has highest correlation with sample frame 12. By finding this position frame with highest correlation, it is concluded that sample frame 12 has a diagonal move to upward and to the right. That is, the optical navigation device has moved upwardly and rightwardly during a time period Δt.

The above-mentioned correlation results, after an interpolation process, can be represented in a bowl-shaped surface having a localized minimum. The bowl-shaped surface is illustrated in FIG. 3. By calculating the minimum of the bowl-shaped surface, the most correlative point may be found as the displacement.

The above described method, however, fails to provide more exact motion vector estimation because the method estimates vector motions by calculating the displacement of the pixels, rather than that of the sub-pixels. Furthermore, this method correlates a search window with the whole image frame and the search window is smaller in size than a whole image frame. Therefore, when the displacement of the optical navigation device is large enough so that the reference image frame is out of the range of the search window, the method cannot judge the moving track of the optical navigation device.

BRIEF SUMMARY OF THE INVENTION

In view of the above-mentioned problems, an object of the invention is to provide a method for detecting the sub-pixel motion of the optical navigation device according to brightness curve equations of captured images instead of correlating a sample image with a reference image, which simplifies the calculations and is free from the limitation of the search window.

In accordance with one embodiment of the present invention, the method for detecting the sub-pixel motion for an optical navigation device includes the steps of: capturing a first image and a second image; choosing plural pixels from the first image as calculation reference pixels; calculating a displacement according to one or more brightness curve equations of the reference pixels that are presented as functions of positional coordinates x and y.

According to another embodiment of the present invention, the method for detecting sub-pixel motion of a navigation device includes capturing a first image frame by an array of sensing elements of the navigation device, capturing a second image frame by the array of sensing elements after a period of time has elapsed since the first image frame was capture, wherein each of the first and second image frames comprises a plurality of image pixels, obtaining one or more brightness curve equations of the first image frame and the second image frame, wherein each of the brightness curve equations is represented as a function of positional coordinates (x, y), and wherein the brightness of pixels of the second image frame remains the same as that in the first image frame but the pixels have shifted in the x and y directions, respectively, and calculating a displacement of the image pixels in the second image frame relative to the first image frame according to the one or more brightness curve equations represented as a function of positional coordinates x and y.

A preferred method of the present invention further comprises calculating partial-derivative of the one or more brightness curve equations for the image pixels using a linear model of first-order derivative Taylor Expansion to generate a plurality of first order equations, and determines the displacement according to the plurality of the first-order equations.

The calculation reference pixels may have the monotonic image brightness variation greater than a threshold value.

Meanwhile, the calculation reference pixels may be classified, and the displacement of the optical navigation device is calculated by summating the classified coefficients so as to reduce the noise.

DETAILED DESCRIPTION OF THE INVENTION

Preferred embodiments of the invention can be implemented in an optical navigation device, such as an optical mouse, to detect sub-pixel motion associated with movement of the optical navigation device. An optical navigation device employing an exemplary method of the invention is described herein with reference to the accompanying drawings.

In accordance with the preferred embodiments of the present invention as described hereinafter, a displacement of a sample image frame from a reference image frame, both of which are captured by a navigation device at different times, can be determined using their brightness curve equations. As will be described with reference to FIG. 4, since the captured image frame is in the form of digital pixel data, the brightness curve equation of the image frame can be represented by a function of sub-pixel positional coordinates (x, y). Assuming that the sample image has same brightness as that of the reference image frame but is shifted by a distance, by calculating the shifted distance, the sub-pixel motion of the navigation device can be therefore determined. According to the present invention, the step of correlating the sample image frame to the reference image frame, as practiced in the prior art, can be therefore omitted.

Figure 1:
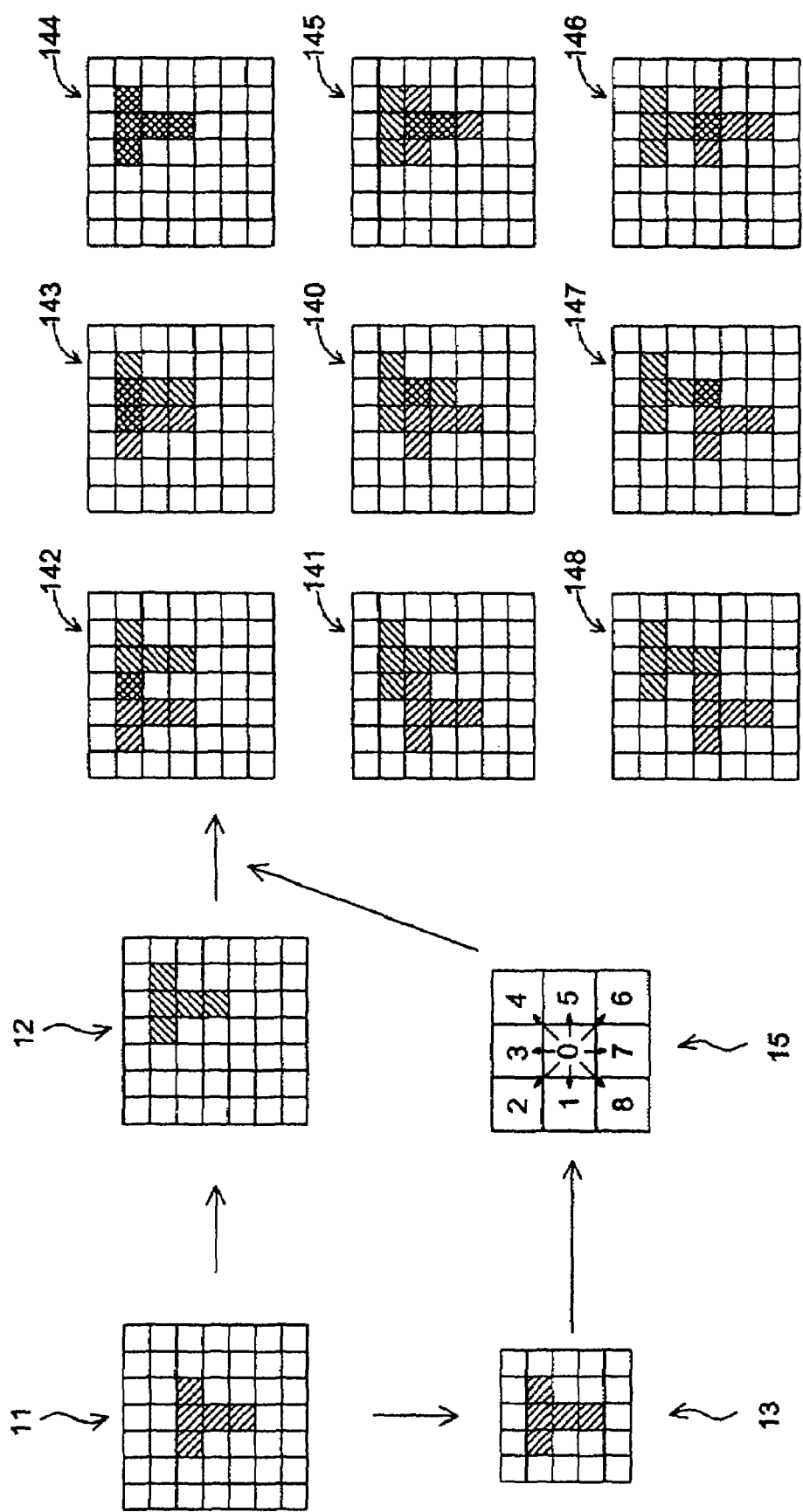
FIG. 1 illustrates an exemplary operational view of a sub-pixel motion detecting method used in a conventional optical navigation device.
Figures 2, 3:
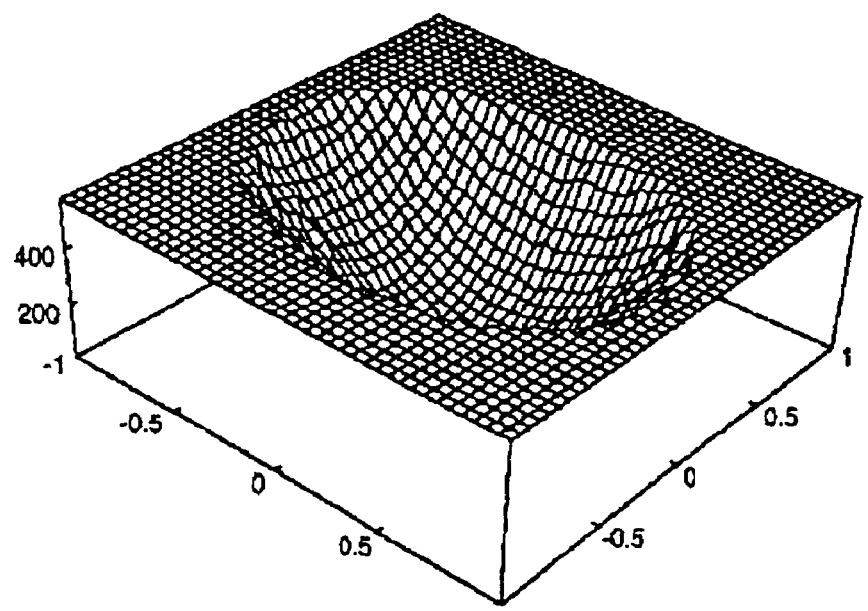
FIG. 2 illustrates a schematic illustration of the positions of the correlation values.
FIG. 3 illustrates a schematic illustration of a quadratic surface.
Figure 4:
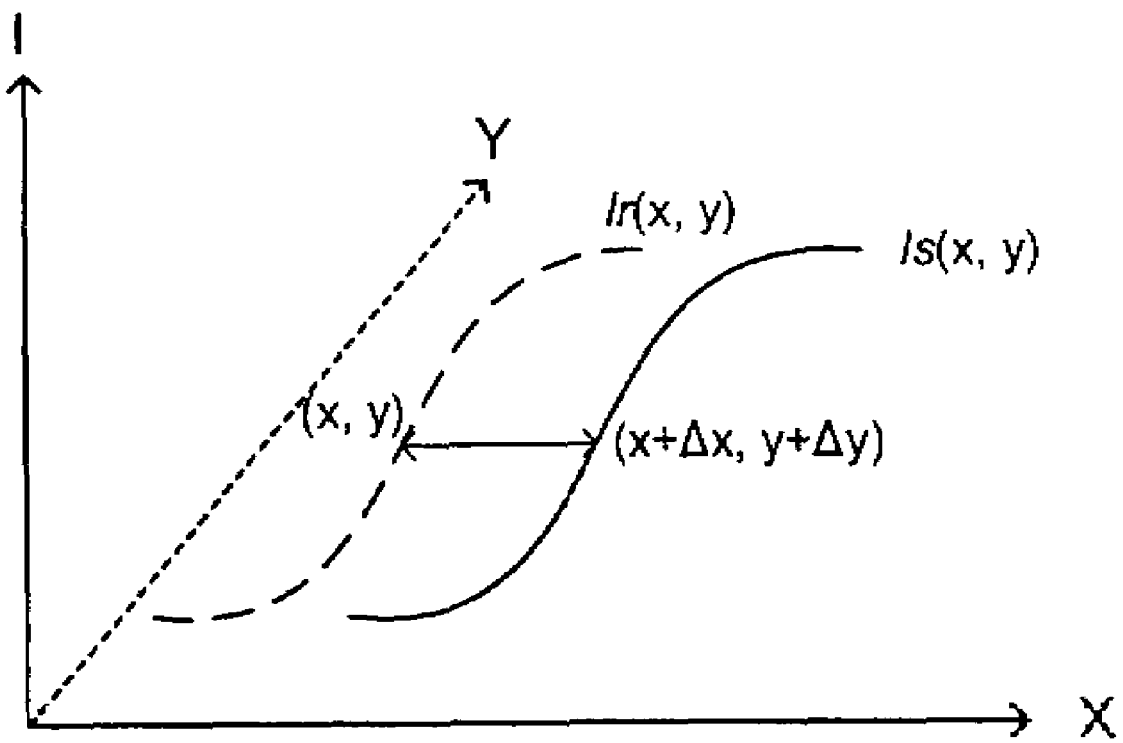
FIG. 4 illustrates the relationship between the position and the brightness, wherein the horizontal axis represents the x position and the vertical axis represents the brightness.

Exemplary embodiments of the method in accordance with the present invention are described below with reference to FIGS. 4-8. FIG. 4 is a relationship diagram between coordinated positions of the sub-pixels and the brightness of the captured image frames, wherein the horizontal axis represents coordinate x and the vertical axis represents the brightness of the image frames. FIGS. 5-8 are flow charts showing different embodiments of the method for detecting sub-pixel motion for an optical navigation device in accordance with the present invention.

Each embodiments of FIGS. 5-8 includes similar steps 51-52, 61-62, 71-72, and 81-82. That is, each of the sub-pixel detection method captures image frames by means of an array of photosensors of the optical navigation device while the optical navigation device is moving on a surface at step 51, 61, 71, and 81. A first (previous) image frame can be chosen as a reference image frame and be stored in a buffer memory in the form of digital pixel data, as shown in step 52, 62, 72, and 82. While the optical navigation device is moving on the surface, each of the methods then captures a second image frame (i.e., sample image frame) reflected on the array of photosensors at a later time. The reference and sample image frames are then being processed to calculate the sub-pixel displacement between the reference image frame and the sample image frame.

As described above, in accordance with the present invention, the detection of the displacement of the second image frame from the first image frame is based on their brightness curves in relation with the positional coordinates of the sub-pixels. As shown in FIG. 4, the dashed curve represents the brightness curve Ir of the first image frame, and the solid curve represents the brightness curve Is of the second image frame. Assumed that the first and second image frames have the same brightness but are captured at different positions (x, y) and (x+$\Delta$x, y+$\Delta$y), respectively, the relationship between the brightness curves Ir and Is can be represented as:

$$Is(x,y) = Ir(x+\Delta x, y+\Delta y) \tag{1}$$

wherein (x, y) is the coordinate of a sub-pixel at the first image frame, (x+$\Delta$x, y+$\Delta$y) is the coordinate of the sub-pixel at the second image frame, and $\Delta$x and $\Delta$y are displacements of the sub-pixel in the x-direction and the y-direction, respectively.

Equation (1) can be expanded according to the first-order partial-derivative Taylor Expansion method. After the expansion, Equation (1) becomes Equation (2) below:

$$\frac{\partial}{\partial x}Ir(x,y)\Delta x + \frac{\partial}{\partial y}Ir(x,y)\Delta y \cong Ir(x,y) - Is(x,y) \tag{2}$$

wherein $$\frac{\partial}{\partial x}Ir(x,y)$$

and $$\frac{\partial}{\partial y}Ir(x,y)$$

can be deemed as a slope (brightness variation) of the sub-pixel in the x direction, and a slope (brightness variation) of the pixel in the y direction, respectively. Thus, $$\frac{\partial}{\partial x}Ir(x,y)$$

and $$\frac{\partial}{\partial y}Ir(x,y)$$

can be substituted by Equations (3) and (4) as follows:

$$I_r^x(x, y) \approx \frac{Ir(x+1, y) - Ir(x-1, y)}{2}, \text{ and} \quad (3)$$

$$I_r^y(x, y) \approx \frac{Ir(x, y+1) - Ir(x, y-1)}{2}. \quad (4)$$

If the brightness values of the first and second image frames at different positions are known, the slopes of the pixel (x, y) in the x and y directions can be calculated from the two image frames. Therefore, Equation (2) can be represented by a two-dimensional first-order equation, such as an equation: a*Δx+b*Δy=Ir(x, y)−Is(x, y), wherein a and b are constants. Accordingly, for an image frame having n*n pixels, (n*n) numbers of two-dimensional first-order equations with two variables Δx and Δy will be generated based on Equations (1)-(4).

Figure 5:
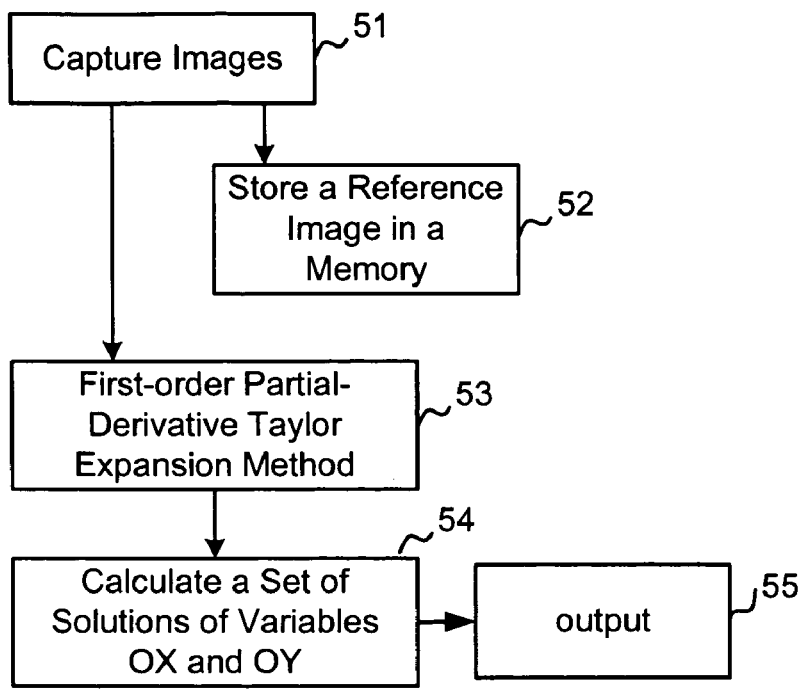
FIG. 5 is a flow chart showing a first embodiment of the method for detecting sub-pixel motion for an optical navigation device in accordance with the invention.

FIG. 5 illustrates a first embodiment of the method for detection the sub-pixel motion in accordance with the present invention. In this embodiment, at step 53, the method directly operates all image pixels of the second image frames according to Equations (1)-(4) to obtain (n*n) numbers of two-dimensional first-order equations, in the case that the image frame has n*n pixels. As known in the art, a set of solution of variables Δx and Δy can be obtained by solving only two two-dimensional first-order equations. At step 54, the method arbitrarily choose two equations from the plurality of equations to obtain one set of solution of variables Δx and Δy. At step 55, the obtained solution of Δx and Δy can then be output indicating the displacement values of the sub-pixel.

Figure 6:
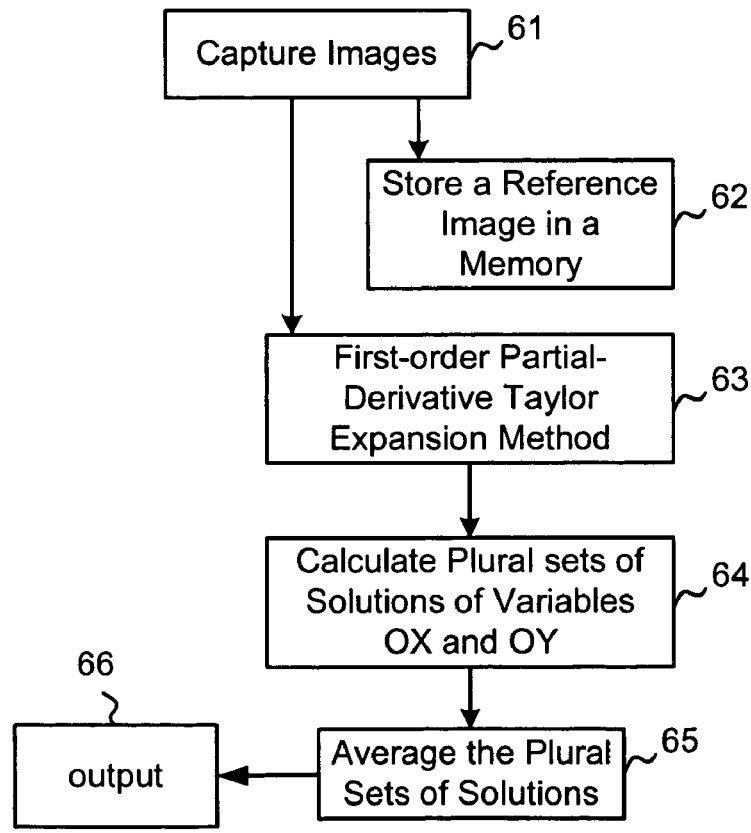
FIG. 6 is a flow chart showing a second embodiment of the method for detecting sub-pixel motion for an optical navigation device in accordance with the invention.

FIG. 6 illustrates a second embodiment of the method for detecting the sub-pixel motion in accordance with the present invention. Similar to step 53 of FIG. 5, at step 63, the second embodiment operates all image pixels according to Equations (1)-(4) to obtain (n*n) numbers of two-dimensional first-order equations. Differently, at step 64, the method solves any two of the plurality of equations to obtain plural sets of solutions of variables Δx and Δy. At step 65, these plural sets of Δx and Δy are then averaged to obtain a set of average values of Δx and Δy. At step 66, the average values of Δx and Δy are output indicating the displacement of the sub-pixel between the referenced image frame and the second image frame.

The above average method of FIG. 6 has a better accuracy than that of FIG. 5. The average method, however, may become imprecise due to the existence of noises. Because that not every image pixel is suitable for the displacement calculation, a third embodiment of FIG. 7 of the present invention selects suitable image pixels as reference pixels for the displacement calculation.

Accordingly, at step 73, the method performs a reliable pixel analysis for all of the image pixels of the captured image frame to filter out unreliable pixels before calculating the displacements according to Equations (1)-(4). The analysis used in the embodiment determines whether the image pixels form a monotone brightness curve. Ideally, any three adjacent pixels of an image frame should have a monotone brightness curve as shown in FIG. 4. Based on the analysis, the image pixels having non-monotone curves are considered as noises and are filtered out without being taken into the calculation. The analysis also determines if the brightness curves of the pixels have lower slopes in either x or y direction. The pixels having lower slope are also filtered out without consideration as these pixels have no significant influence on the calculation. Furthermore, the analysis determines if the brightness value of the pixels is greater than a threshold value Ith. If the pixels have brightness values lower than the threshold value Ith, these pixels will be filtered out without consideration. In an exemplary embodiment, the value of Ith is about 5 frame rate for a 64 bit array and 20 frame rate for a 264 bit array.

The following Equations (5)-(10) are used by step 73 to select reliable pixels for calculation, wherein Equations (5), (6), and (7) are used to select the reliable pixels in the x direction, and Equations (8), (9) and (10) are used to select the reliable pixels in the y direction.

$$(Ir(x+1,y)-Ir(x,y))\cdot(Ir(x,y)-Ir(x-1,y))>0 \quad (5),$$

$$|Ir(x+1,y)-Ir(x,y)|>Ith \quad (6),$$

$$|Ir(x,y)-Ir(x-1,y)|>Ith \quad (7),$$

$$(Ir(x,y+1)-Ir(x,y))\cdot(Ir(x,y)-Ir(x,y-1))>0 \quad (8),$$

$$|Ir(x,y+1)-Ir(x,y)|>Ith \quad (9), \text{ and}$$

$$|Ir(x,y)-Ir(x,y-1)|>Ith \quad (10)$$

After the reliable-pixel analysis, only the image pixels that satisfy the above Equations (5) to (10) are used for calculating the displacements according to Equations (1)-(4).

At step 74, the method performs the first-order partial-derivative Taylor expansion method according to Equations (1)-(4) for the pixels that pass the reliable-pixel analysis of step 73 and obtains a plurality of two-dimensional first-order equations. At step 75, the method calculates at least one set of the solutions of variables Δx and Δy and outputs the set of solution of Δx and Δy as a displacement indication of the sub-pixel. The calculation of step 75 may be the same as described in step 54 of FIG. 5, which obtains one set of solutions of Δx and Δy by solving only two of the plurality of two-dimensional first-order equations. The calculation of step 75 may also be the same as described in step 64 of FIG. 6, which obtains a plurality of solutions of Δx and Δy by solving any two of two-dimensional first-order equations. In the latter case, the plural results are then averaged to obtain a set of average solutions of Δx and Δy. In either case, the final result is output indicating the displacement of the sub-pixel, as shown in step 76.

Figure 7:
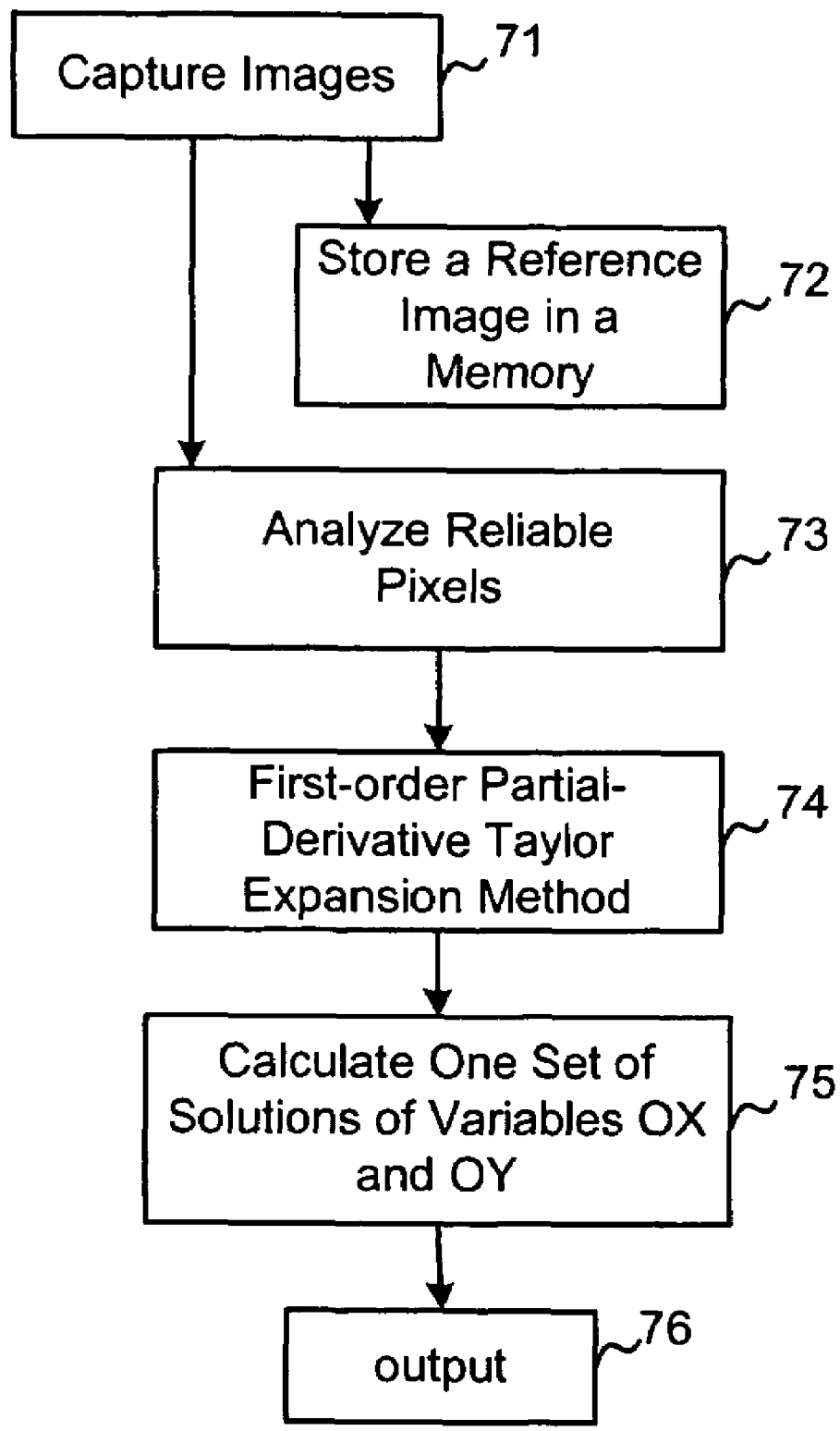
FIG. 7 is a flow chart showing a third embodiment of the method for detecting sub-pixel motion for an optical navigation device in accordance with the invention.

The method for analyzing the reliable pixels as described in the embodiment of FIG. 7 is effective in filtering out great noises but has an insignificant effect in filtering out slight noises. Consequently, a fourth embodiment of the present invention classifies the image pixels selected after the reliable-pixel analysis to further reduce the noise, which is described below with reference to FIG. 8.

Figure 8:
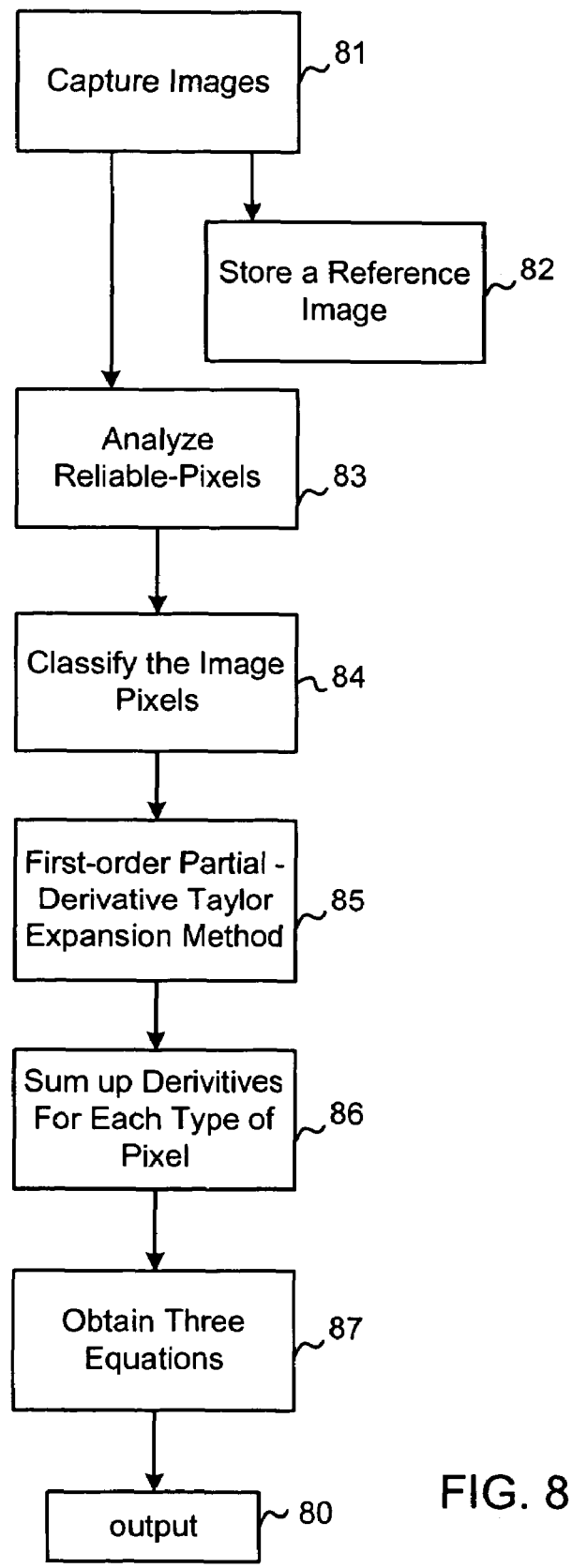
FIG. 8 is a flow chart showing a fourth embodiment of the method for detecting sub-pixel motion for an optical navigation device in accordance with the invention.

As shown in FIG. 8, after analyzing reliable pixels at step 83 as described with reference to step 73 of FIG. 7, the method next classifies the reliable image pixels into three types of image pixels, at step 84. A first type of image pixels has a larger slope in x direction and is defined as $R_x$. A second type of image pixels has a larger slope in y direction and is defined as $R_y$. A third type of image pixels has a substantially uniform slope along two directions and is defined as $R_z$.

The reference to a larger slope in x direction means that the slope of the pixel in the x direction is far greater than that in the y direction. Since the slopes of the x and y directions may be represented by Equations (3) and (4), the first type of image pixels may be defined as Equation (11) below:

$$|I_r^x(x,y)|>K|I_r^y(x,y)|, K>0 \quad (11)$$

Similarly, the reference to a larger slope of y direction means that the slope of the pixel in the y direction is far greater than that in the x direction. Since the slopes of the x and y directions may be represented by Equations (3) and (4), the second type of image pixels may be defined as Equation (12) below:

$$|I_r^y(x,y)|>K|I_r^x(x,y)|, K>0 \quad (12)$$

The image pixels that do not belong to the first and second kinds are classified as the third type of image pixels.

Next, at step 85, for each image pixel selected from the reliable-pixel analysis, the method performs the first-order partial-derivative Taylor expansion method to obtain a number of Taylor expansion equations. Thereafter, at step 86, the method sums up partial-derivatives of the Taylor expansion equations for each type of image pixel according to Equations (13) to (15):

$$\left(\sum_{(x,y)\in R_x} |I_r^x(x, y)|\right)\Delta x + \left(\sum_{(x,y)\in R_x} S_x I_r^y(x, y)\right)\Delta y = \sum_{(x,y)\in R_x} S_x \Delta I(x, y), \quad (13)$$

$$\left(\sum_{(x,y)\in R_y} S_y I_r^x(x, y)\right)\Delta x + \left(\sum_{(x,y)\in R_y} |I_r^y(x, y)|\right)\Delta y = \sum_{(x,y)\in R_y} S_y \Delta I(x, y), \quad (14)$$

and $$\left(\sum_{(x,y)\in R_z} |I_r^x(x, y)|\right)\Delta x + \left(\sum_{(x,y)\in R_z} S_x I_r^y(x, y)\right)\Delta y = \sum_{(x,y)\in R_z} S_x \Delta I(x, y), \quad (15)$$

wherein $S_x = \text{sign}(I_r^x(x, y))$ and $S_y = \text{sign}(I_r^y(x, y))$ represent the positive and negative signs of $I_r^x(x, y)$ and $I_r^y(x, y)$, respectively, and the values thereof are 1 or −1.

As described above, the first type of image pixels has a larger slope in the x direction, which means that the absolute value of the coefficients of $\Delta x$ after derivation should be greater than the coefficient of $\Delta y$ after derivation. The absolute values of the coefficients of $\Delta x$ are summed up to reduce the noise of the x direction. According to Equation (13), $\Delta y$ and the constants have to be simultaneously changed according to the positive/negative signs of the coefficients of $\Delta x$. If the coefficients of $\Delta x$ are positive, the coefficients of $\Delta y$ and the constants maintain unchanged. If the coefficients of $\Delta x$ is negative, the coefficient of $\Delta y$ and the constant are multiplied by −1.

Similarly, as the second type of image pixels has a greater slope in the y direction, the absolute values of the coefficients of $\Delta y$ are greater than that of the coefficients of $\Delta x$. The summation of the coefficients of $\Delta y$ may also reduce the noise of the y direction. According to Equation (14), the coefficients of $\Delta x$ and the constants have to be simultaneously changed according to the positive/negative signs of the coefficients of $\Delta y$. That is, when the coefficient of $\Delta y$ is positive, the coefficient of $\Delta x$ and the constant remain unchanged; when the coefficient of $\Delta y$ is negative, the coefficient of $\Delta x$ and the constant are multiplied by −1.

With regard to the third type of image pixels, as the slopes of the x and y directions of the image pixels are substantially the same, the method can arbitrarily sum up the coefficients of $\Delta x$ or those of $\Delta y$ to reduce the noise in the x or y direction. The manner for processing the positive/negative signs of the coefficients of $\Delta x$ or $\Delta y$ is the same as that in the first or second type of image pixels, and accordingly, the detailed description thereof is omitted herein.

At step 87, after performing Equations (13)-(15), three two-dimensional first-order equations can then be obtained. As only two two-dimensional first-order equations are needed to obtain a set of solution of the solution of $\Delta x$ and $\Delta y$, three sets of solutions of the solution of $\Delta x$ and $\Delta y$ can be obtained from solving any two of the three equations. In accordance with the embodiment of the present invention, it is possible to solve only two of the three equations to obtain only one set of solutions. The present invention can also solve two combinations of the three equations to obtain two sets of solutions, or solve three combinations of the three equations to obtain three sets of solutions. In the two latter cases, the results are averaged before being output 88.

The embodiment as described in FIG. 8 may also directly process all the image pixels without selecting reliable pixels. That is, step 83 can be omitted.

Furthermore, as the displacement of the sub-pixel is represented by positional coordinates $\Delta x$ and $\Delta y$, a navigational signal indicating the coordinate of the sub-pixel in the second image frame can be output to a processor for further processing. The further processes may include determining if the detection of the displacement is valid and determining if the second image frame should be considered as a new reference image frame.

Figure 9:
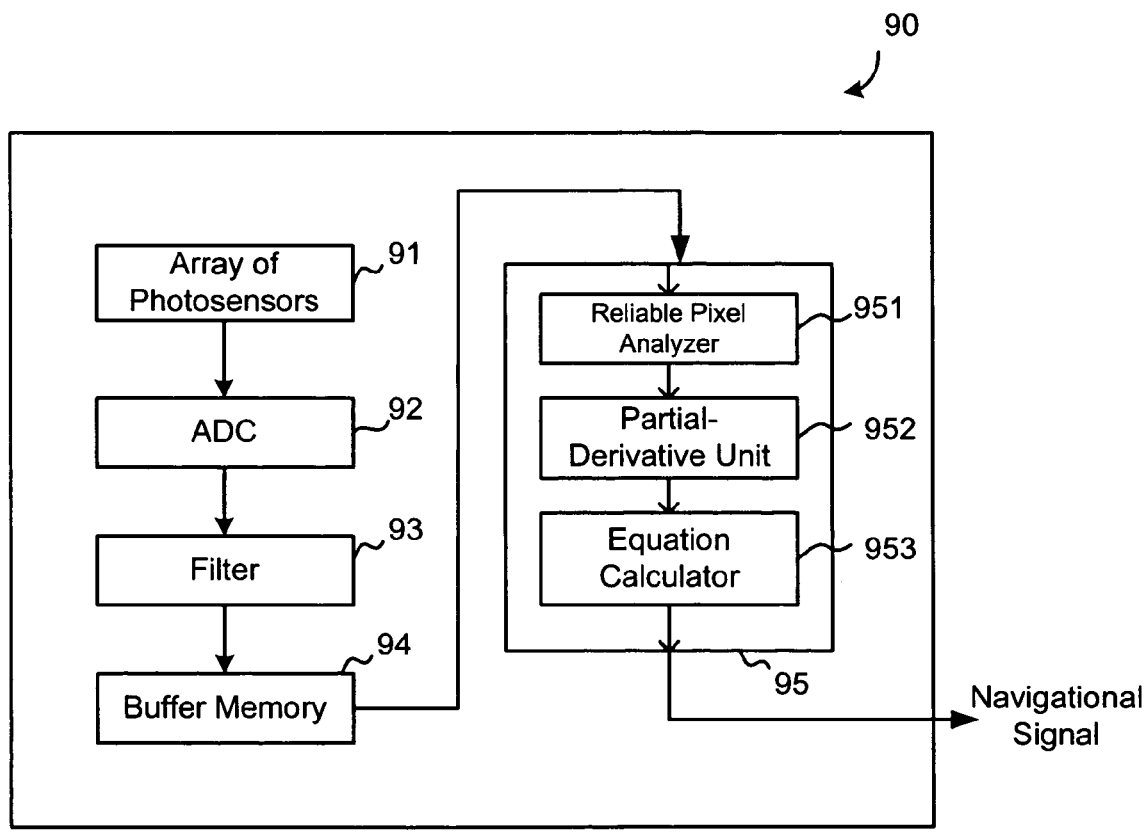
FIG. 9 is a schematic diagram of an exemplary integrated circuit of a navigation device that can be used to implement the embodiments depicted in FIGS. 5-8.

One or more of the above methods of the present invention can be carried out by an integrated circuit. FIG. 9 shows an exemplary schematic diagram of integrated circuit 90 that is used in a navigation device (not shown), such as an optical mouse, to generate a navigation signal. As depicted in FIG. 9, integrated circuit 90 includes an array of photosensors 91 for capturing images reflected thereon, analog-to-digital converter 92 for converting the captured image data, filtering circuit 93 for filtering undesired noise from the captured image data, and buffer memory 94 for storing the captured images after filtering in the form of digital pixel data. Integrated circuit 90 further includes processor 95 for processing the images captured by array of photosensors 91 to generate a navigation signal. As described in FIGS. 5-8, processor 95 may detect sub-pixel motions of the captured image frames and calculates the displacements of the sub-pixels according to above Equations (1)-(15). To do so, processor 95 may include reliable pixel analyzer 951 for determining reliable pixels, partial-derivative unit 952 for classifying the types of the pixels, and equation calculator 953 for calculating the displacements of the sub-pixels of a sample image frame in relation to a reference image frame. Afterward, a navigational signal indicating coordinal positions of the pixels is obtained.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. A method for detecting sub-pixel motion of an optical mouse, comprising:
    moving the optical mouse;
    capturing a first image frame, wherein the first image frame comprises a plurality of image pixels;
    selecting one or more of the plurality of image pixels as reference pixels;
    capturing a second image frame after a period of time has elapsed since the first image frame was captured; and determining a displacement of the reference pixels in the second image frame relative to the first image frame using one or more brightness curve equations represented as a function of positional coordinates x and y;

wherein the reference pixels satisfy the following equations:

$(Ir(x+1,y)-Ir(x,y))\cdot(Ir(x,y)-Ir(x-1,y))>0,$ $|Ir(x+1,y)-Ir(x,y)|>Ith,$ $|Ir(x,y)-Ir(x-1,y)|>Ith,$ $(Ir(x,y+1)-Ir(x,y))\cdot(Ir(x,y)-Ir(x,y-1))>0,$ $|Ir(x,y+1)-Ir(x,y)|>Ith,$ and $|Ir(x,y)-Ir(x,y-1)|>Ith,$ where Ir represents the brightness value of reference image coordinate (x, y), and Ith is a threshold which has a value of plural frame rates.

2. The method according to claim 1, wherein the first image frame and the second image frame have an identical brightness curve.

3. The method according to claim 1, further comprising using a first-order partial-derivative function of Taylor Expansion for the reference pixels, represented as:

$$\frac{\partial}{\partial x}Ir(x, y)\Delta x + \frac{\partial}{\partial y}Ir(x, y)\Delta y \cong Ir(x, y) - Is(x, y),$$

wherein Ir(x, y) represents brightness of the first image frame, Is(x, y) represents brightness of the second image frame, $\Delta x$ represents a displacement of the second image frame in x direction, $\Delta y$ represents a displacement of the second image frame in y direction, $$\frac{\partial}{\partial x}(x, y)$$

represents an x-partial-derivative, and $$\frac{\partial}{\partial y}(x, y)$$

represents a y-partial-derivative.

4. The method according to claim 3, wherein the x-partial-derivative of the first-order partial-derivative function represents a pixel brightness variation in the x direction, and is represented by:

$$\frac{\partial}{\partial x}(x, y) \approx \frac{Ir(x+1, y) - Ir(x-1, y)}{2}.$$

5. The method according to claim 3, wherein the y-partial-derivative of the first-order partial-derivative function represents a pixel brightness variation in the y direction, and is represented by:

$$\frac{\partial}{\partial y}(x, y) \approx \frac{Ir(x, y+1) - Ir(x, y-1)}{2}.$$

6. The method according to claim 3, further comprising:

summating the first-order equations calculated from a first type of reference pixels to generate a first type of first-order equation, wherein the first type of reference pixels has a pixel light brightness variation in the x direction greater than a predetermined proportion of a pixel brightness variation in the y direction;

summating the first-order equations calculated from a second type of reference pixels to generate a second type of first-order equation, wherein the second type of reference pixels has the pixel light brightness variation in the y direction greater than a predetermined proportion of the pixel brightness variation in the x direction;

summating the first-order equations calculated from a third type of reference pixels to generate a third type of first-order equation, wherein the third type of reference pixels includes the reference pixels that do not belong to the first and second types of calculation reference pixels; and calculating the displacement of the reference pixels according to the first type, the second type, and the third type of first-order equations.

7. The method according to claim 6, wherein the first type of reference pixels satisfy the following equation:

$|I_r^x(x,y)|>K|I_r^y(x,y)|,$ wherein $|I_r^x(x, y)|$ represents an absolute value of the pixel brightness variation in the x direction, $|I_r^y(x, y)|$ represents an absolute value of the pixel brightness variation in the y direction, and K is a positive constant.

8. The method according to claim 6, wherein the second type of reference pixels satisfy the following equation:

$|I_r^y(x,y)|>K|I_r^x(x,y)|,$ wherein $|I_r^x(x, y)|$ represents an absolute value of the pixel brightness variation in the x direction, $|I_r^y(x, y)|$ represents an absolute value of the pixel brightness variation in the y direction, and K is a positive constant.

9. The method according to claim 1, wherein the displacement is determined based on any two of a plurality of first-order equations associated with the brightness curve equations.

10. The method according to claim 9, wherein determining the displacement of the reference pixels further comprising:

calculating more than one displacement values from more than two of the plurality of first-order equations; and averaging the more than one displacement values to obtain a final displacement value.

11. A method for detecting sub-pixel motion of an optical mouse, comprising:

moving the optical mouse;

capturing a first image frame by an array of sensing elements of the optical mouse;

capturing a second image frame by the array of sensing elements after a period of time has elapsed since the first image frame was captured, wherein each of the first and second image frames comprises a plurality of image pixels;

selecting one or more image pixels from the first image frame as reference pixels;

obtaining one or more brightness curve equations of the first image frame and the second image frame, wherein each of the brightness curve equations is represented as a function of positional coordinates (x, y), and wherein the brightness of pixels of the second image frame remains the same as that of the first image frame but the pixels have shifted in at least one of the x and y directions, calculating partial-derivative of the one or more brightness curve equations for the reference pixels using a linear model of first-order derivative Taylor Expansion to generate a plurality of first order equations; and calculating a displacement of the reference pixels in the second image frame relative to the first image frame according to the plurality of the first-order equations;

wherein the reference pixels satisfy the following equations:

$(Ir(x+1,y)-Ir(x,y))\cdot(Ir(x,y)-Ir(x-1,y))>0,$ $|Ir(x+1,y)-Ir(x,y)|>Ith,$ $|Ir(x,y)-Ir(x-1,y)|>Ith,$ $(Ir(x,y+1)-Ir(x,y))\cdot(Ir(x,y)-Ir(x,y-1))>0,$ $|Ir(x,y+1)-Ir(x,y)|>Ith,$ and $|Ir(x,y)-Ir(x,y-1)|>Ith,$ where Ir represents the brightness value of reference image coordinate (x, y), and Ith is a threshold which has a value of plural frame rates.

12. The method according to claim 11, wherein the brightness of the pixels in the first and second image frames meets the following equations:

$Is(x,y)=Ir(x+\Delta x, y+\Delta y)$ wherein Ir represents the brightness of the first image, Is represents the brightness of the second image, (x, y) are the coordinates of the pixels in the first image frame, (x+Δx, y+Δy) are the coordinates of the pixels at the second image frame, and Δx and Δy are displacements of the pixels in the x-direction and the y-direction, respectively.

13. The method according to claim 11, wherein the first-order partial-derivative function of Taylor Expansion for the reference pixels is:

$$\frac{\partial}{\partial x}Ir(x, y)\Delta x + \frac{\partial}{\partial y}Ir(x, y)\Delta y \cong Is(x, y) - Ir(x, y),$$

wherein Ir(x, y) represents the brightness of the first image, Is(x, y) represents the brightness of the second image, Δx represents a displacement of the second image in x direction, Δy represents a displacement of the second image in y direction, $$\frac{\partial}{\partial x}(x, y)$$

represents an x-partial-derivative, and $$\frac{\partial}{\partial y}(x, y)$$

represents a y-partial-derivative.

14. The method according to claim 13, wherein the x-partial-derivative of the first-order partial-derivative function represents a pixel brightness variation in the x direction, and is represented by:

$$\frac{\partial}{\partial x}(x, y) \approx \frac{Ir(x+1, y) - Ir(x-1, y)}{2}.$$

15. The method according to claim 13, wherein the y-partial-derivative of the first-order partial-derivative function represents a pixel brightness variation in the y direction, and is represented by:

$$\frac{\partial}{\partial y}(x, y) \approx \frac{Ir(x, y+1) - Ir(x, y-1)}{2}.$$

16. The method according to claim 11, wherein calculating the displacement is based on any two of the plurality of first-order equations.

17. The method according to claim 11, wherein calculating the displacement of the reference pixels further comprises:

calculating more than one displacement values from more than two of the plurality of first-order equations; and averaging the more than one displacement values to obtain a final displacement value.

18. A sensing device for an optical mouse, comprising:

a sensor array for capturing images reflected on the sensing device; and a processor for determining a sub-pixel motion of the sense device associated with movement of the optical mouse, wherein the sensor array is configured to capture a first image frame at a first time point in which a plurality of image pixels are selected as reference pixels and a second image frame at a second time point, and to track positions of the reference pixels in the first image frame and the second image frame, wherein the first and second images and the reference pixels are represented by functions of sub-pixel positional coordinates x and y, and the reference pixels satisfy the following equations:

$(Ir(x+1,y)-Ir(x,y))\cdot(Ir(x,y)-Ir(x-1,y))>0,$ $|Ir(x+1,y)-Ir(x,y)|>Ith,$ $|Ir(x,y)-Ir(x-1,y)|>Ith,$ $(Ir(x,y+1)-Ir(x,y))\cdot(Ir(x,y)-Ir(x,y-1))>0,$ $|Ir(x,y+1)-Ir(x,y)|>Ith,$ and $|Ir(x,y)-Ir(x,y-1)|>Ith,$ where Ir represents the brightness value of reference image coordinate (x, y), and Ith is a threshold which has a value of plural frame rates;

wherein the processor is configured to calculate a displacement of the reference pixels in the second image frame relative to the first image frame according to one or more brightness curve equations represented as a function of positional coordinates (x, y).

19. The sensing device according to claim 18, wherein the processor is further configured to calculate partial-derivatives of the brightness curve equations of the reference pixels using a linear model of first-order derivative Taylor Expansion to generate a plurality of first-order partial-derivative equations; and to determine the displacement according to the plurality of first order partial-derivative equations.

20. The sensing device according to claim 19, wherein the x-partial-derivative of the first-order partial-derivative function represents a pixel brightness variation in the x direction, and is represented by:

$$\frac{\partial}{\partial x}(x, y) \approx \frac{Ir(x+1, y) - Ir(x-1, y)}{2}.$$

21. The sensing device according to claim 19, wherein the y-partial-derivative of the first-order partial-derivative function represents a pixel brightness variation in the y direction, and is represented by:

$$\frac{\partial}{\partial y}(x, y) \approx \frac{Ir(x, y+1) - Ir(x, y-1)}{2}.$$

22. The sensing device according to claim 19, wherein the processor calculates the displacement based on any two of the plurality of first-order equations.

23. The sensing device according to claim 19, wherein the processor is further configured to calculate the displacement of the reference pixels by:
   calculating more than one displacement values from more than two of the plurality of first-order equations; and
   averaging the more than one displacement values to obtain a final displacement value.

24. The sensing device according to claim 18, wherein the first-order partial-derivative function of Taylor Expansion for the reference pixels is:

$$\frac{\partial}{\partial x}Ir(x, y)\Delta x + \frac{\partial}{\partial y}Ir(x, y)\Delta y \cong Is(x, y) - Ir(x, y),$$

wherein Ir(x, y) represents pixel brightness of the reference pixels of the first image, Is(x, y) represents pixel brightness of the calculation reference pixels of the second image, $\Delta x$ represents a displacement of the reference pixels in x direction, $\Delta y$ represents a displacement of the reference pixels in y direction, $$\frac{\partial}{\partial x}(x, y)$$

represents an x-partial-derivative, and $$\frac{\partial}{\partial y}(x, y)$$

represents a y-partial-derivative.

25. The sensing device according to claim 18, wherein the reference pixels comprises three types of calculation reference pixels comprising:
   summating the first-order equations calculated from a first type of reference pixels to generate a first type of first-order equation, wherein the first type of reference pixels has a pixel light brightness variation in the x direction greater than a predetermined proportion of a pixel brightness variation in the y direction;
   summating the first-order equations calculated from a second type of reference pixels to generate a second type of first-order equation, wherein the second type of reference pixels has the pixel light brightness variation in the y direction greater than a predetermined proportion of the pixel brightness variation in the x direction;
   summating the first-order equations calculated from a third type of reference pixels to generate a third type of first-order equation, wherein the third type of reference pixels includes the reference pixels that do not belong to the first and second types of calculation reference pixels; and
   calculating the displacement of the reference pixels according to the first type, the second type, and the third type of first-order equations.

26. The sensing device according to claim 25, wherein the first type of reference pixels satisfy the following equation:

$$|I_r^x(x,y)| > K|I_r^y(x,y)|,$$

wherein $|I_r^x(x, y)|$ represents an absolute value of the pixel brightness variation in the x direction, $|I_r^y(x, y)|$ represents an absolute value of the pixel brightness variation in the y direction, and K is a positive constant.

27. The sensing device according to claim 25, wherein the second type of reference pixels satisfy the following equation:

$$|I_r^y(x,y)| > K|I_r^x(x,y)|,$$

wherein $|I_r^x(x, y)|$ represents an absolute value of the pixel brightness variation in the x direction, $|I_r^y(x, y)|$ represents an absolute value of the pixel brightness variation in the y direction, and K is a positive constant.

* * * * *